US008681990B2

(12) United States Patent
Cachin et al.

(10) Patent No.: US 8,681,990 B2
(45) Date of Patent: Mar. 25, 2014

(54) RENEWAL MANAGEMENT FOR DATA ITEMS

(75) Inventors: Christian Cachin, Thalwil (CH); Patrick Droz, Rueschlikon (CH); Robert Haas, Adliswil (CH); Xiao-Yu Hu, Horgen (CH); Ilias Iliadis, Rueschlikon (CH); René A. Pawlitzek, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 12/411,791

(22) Filed: Mar. 26, 2009

(65) Prior Publication Data

US 2009/0245519 A1 Oct. 1, 2009

(30) Foreign Application Priority Data

Mar. 28, 2008 (EP) .................................. 08103050

(51) Int. Cl.
*H04L 9/00* (2006.01)
(52) U.S. Cl.
USPC ............. 380/277; 380/273; 700/89; 700/101; 718/103
(58) Field of Classification Search
None
See application file for complete search history.

(56) References Cited

U.S. PATENT DOCUMENTS

| 5,890,134 | A  | * | 3/1999 | Fox ............................. 705/7.24 |
| 6,112,221 | A  | * | 8/2000 | Bender et al. ................. 718/102 |
| 6,782,103 | B1 | * | 8/2004 | Arthan et al. ................. 380/278 |
| 7,243,234 | B2 | * | 7/2007 | Newkirk ........................ 713/171 |
| 7,281,107 | B2 | * | 10/2007 | Iitsuka ......................... 711/165 |
| 7,590,664 | B2 | * | 9/2009 | Kamohara et al. .................... 1/1 |
| 2004/0083477 | A1 | * | 4/2004 | Acharya et al. ............... 718/102 |
| 2006/0190943 | A1 | * | 8/2006 | Haeri ............................ 718/103 |

OTHER PUBLICATIONS

G. Buttazzo, "Hard Real-Time Computing Systems: Predictable Scheduling Algorithms and Applications," 1997, Kluwer Academic Publishers, Ch. 3, pp. 51-76, Accessed: Nov. 22, 2011, Retrieved: [http://www.fisica.unlp.edu.ar/electro/temas/p7/HRT/].*
S. Baruah, et al, "Fair On-Line Scheduling of a Dynamic Set of Tasks on a Single Resource," Feb. 1996, Information Processing Letters, vol. 64, pp. 43-51.*
L. Kruk, et al, "Earliest-Dealing-First Service in Heavy-Traffic Acyclic Networks," Jul. 8, 2004, The Annals of Applied Probability, vol. 14, No. 3, pp. 1306-1352.*

(Continued)

*Primary Examiner* — Jung Kim
*Assistant Examiner* — Robert Leung
(74) *Attorney, Agent, or Firm* — Gail H. Zarick; Otterstedt, Ellenbogen & Kammer, LLP (57) ABSTRACT

A system, method apparatus, and computer readable medium for managing renewal of a dynamic set of data items. Each data item has an associated renewal deadline, in a data item management system. A renewal schedule allocates to each data item a renewal interval for renewal of the data item. On addition of a new data item, if a potential renewal interval having a duration required for renewal of the data item, and having an ending at the renewal deadline for that item does not overlap a time period in the schedule during which the system is busy, the renewal schedule is automatically updated by allocating the potential renewal interval to the new data item. If the potential renewal interval does overlap a busy period, the renewal schedule is automatically updated by selecting an earlier renewal interval for at least one data item in the set.

29 Claims, 4 Drawing Sheets

(56) References Cited

OTHER PUBLICATIONS

Netapp Global Services, "Data Migration Best Practices," Jan. 2006, Accessed: Nov. 23, 2011, Retrieved: [http://partners.netapp.com/go/techontap/NGS_migration.pdf].*

Oracle, "Oracle Database: Security Guide 10g Release 1 (10.1)," Dec. 2003, Part No. B10773-01, Ch. 16, pp. 10-13.*

J. Jackson, "Trade groupd says study shows advantages of tape storage," Nov. 10, 2004, Government Computer News, Accessed: Nov. 23, 2011, Retrieved: [http://gcn.com/404.aspx?404;http://gcn.com/Articles/2004/11/10/Trade-group-says-study-shows-advantages-of-tape-st.aspx].*

A. Mohammadi, et al. "Scheduling Algorithms for Real-Time Systems," Technical Report No. 2005-499, School of Computing at Queen's University, Jul. 15, 2005, Retrieved Jul. 25, 2012, Online: http://research.cs.queensu.ca/home/akl/techreports/scheduling.pdf.*

S. Choi, "Scheduling Aperiodic and Sporadic Tasks in Hard Real-Time Systems," May 7, 1997, Institute for Advanced Computer Studies @ University of Maryland.*

B. Sprunt, "Aperiodic Task Scheduling for Real-Time Systems," Aug. 1990, Ph.D. Dissertation @ Carnegie Mellon University.*

S. Chand, et al. "Single machine scheduling to minimize weighted earliness subject to no tardy jobs" Eur. J. Oper. Res., vol. 34, pp. 221-230, 1988.

K. R. Baker, et al. "Sequencing with earliness and tardiness penalties: a review", Operations Research, vol. 38, 1990, pp. 22-36, 1990.

D. G. Pandelis, et al. "Optimal stochastic . . . Costs", In proceedings of the 32nd IEEE Conference on Decision and Control, vol. 4, pp. 3618-3623, Dec. 1993.

J. S. Davis, et al, "Single-machine scheduling with early and tardy completion costs", Naval Research Logistics, vol. 40, pp. 85-101, 1993.

M. Azizoglu, et al. "Scheduling to minimize maximum earliness and . . . allowed", Journal of Operational Research Society, vol. 54, No. 6, pp. 661-664, Jun. 2003.

* cited by examiner

RENEWAL MANAGEMENT FOR DATA ITEMS

CROSS-REFERENCE TO RELATED APPLICATION

This application claims priority under 35 U.S.C. §119(a) from European Patent Application no. 08103050.4 filed Mar. 28, 2008, the entire contents of which are incorporated herein by reference.

BACKGROUND OF THE INVENTION

1. Field of the Invention

The present invention relates generally to renewal management for data items. A method, apparatus, system and computer readable medium are provided for managing renewal of a dynamic set of data items, each of which has an associated renewal deadline, in a data item management system.

2. Description of the Related Art

Cryptographic keys provide one example of data items which must be renewed from time to time. Cryptographic-key management represents a strategic control point. With the upcoming proliferation of symmetric and asymmetric keys used for encryption purposes in various applications such as tape or disk storage systems, communications and other applications, a global key management system with a generic and automated key-life-cycle management function becomes imperative. For instance, with the extension of encryption to the LTO-4 (Linear Tape-Open 4) magnetic storage technology, the number of encryption keys that must be managed explicitly will increase dramatically. Thousands of keys every month may have to be created, backed-up, served, archived, renewed, and possibly destroyed in compliance with current business policies and in a centrally-auditable fashion.

Aspects of the present invention address issues which include renewing, refreshing, rollover or rotation of keys. Current renewal management systems renew keys before expiry as required, key renewals being sufficiently spaced in time that no particular problem arises. Aspects of the present invention also address the issue that as the number of keys to be managed increases, and the time between generation and hence expiration of successive keys decreases, current renewal schemes become inadequate. Specifically, renewal deadlines for keys may be missed, as will be demonstrated below with reference to FIG. 1 of the accompanying drawings.

For example, when keys are generated, a renewal deadline (expiration time) is associated with each. If $S_N = \{k_1, k_2, \ldots, k_i, \ldots, k_N\}$ is a set of N generated keys, and $g_i$ and $e_i$ denote the generation and expiration times of key $k_i$, for $i=1, 2, \ldots, N$, then the lifetime $U_i$ of key $k_i$ is equal to the difference $e_i - g_i$, i.e. $U_i = e_i - g_i$. Assuming, without loss of generality, that the lifetime is constant for all keys, i.e. $U_i = U$, for $i=1, 2, \ldots, N$, and also assuming that the duration of the process for renewing a key is $\Delta$ time units, for key $k_i$ to be renewed before it expires, its renewal should begin the latest at time $\tau_i$, referred to as slack time, with $\tau_i = e_i - \Delta$. Denoting by $r_i$ key $k_i$'s renewal time, it should hold that $r_i \leq \tau_i$. The later the renewal times, the lower the rate of key renewals, and therefore the lower the load on the processor engaged to perform the key renewals. Consequently, for performance enhancement, it is desirable that renewals occur as late as possible, i.e. $r_i$ should be as close to $\tau_i$ as possible.

Figure 1:
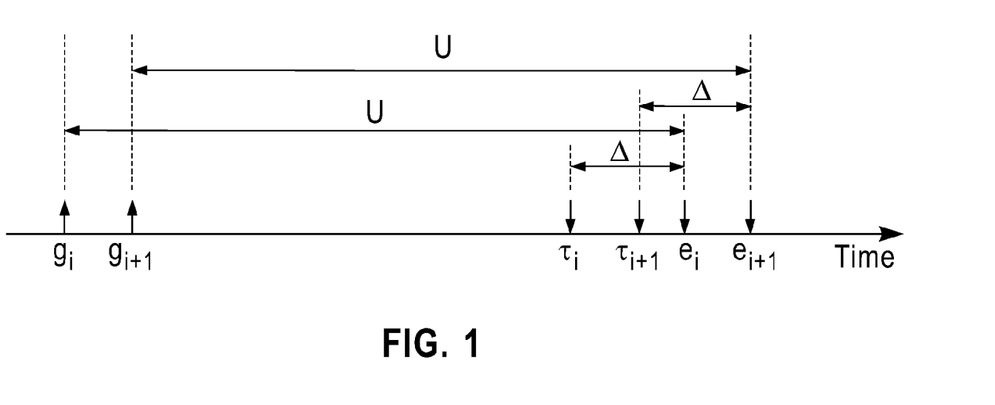
FIG. 1 illustrates a problem with overlapping renewal intervals in the lifetime of two cryptographic keys.

A problem with simply following the above guidelines when scheduling key renewals is illustrated in FIG. 1. The lifetime of successive keys $k_i$ and $k_{i+1}$ is indicated along the time axis. The renewal of $k_i$ and $k_{i+1}$ are scheduled at $r_i = \tau_i$ and $r_{i+1} = \tau_{i+1}$ respectively, but $\tau_{i+1}$ falls in the renewal interval $(\tau_i, e_i)$ for $k_i$ in which the processor will be renewing $k_i$. Assuming for simplicity that the processor can renew at most one key at any given time, the processor will be busy during the renewal interval $(\tau_i, e_i)$ so the renewal of $k_{i+1}$ can only start after completion of renewal of $k_i$, i.e. $r_{i+1} \geq e_i$. This in turn implies that $k_{i+1}$ will prematurely expire given that $r_{i+1} > \tau_{i+1}$. While the problem arises here because the renewal intervals for two keys $k_i$ and $k_{i+1}$ overlap, note that the same problem can occur in the more general case where the processor is capable of simultaneously processing up to a given number of multiple keys. In the latter case, missed deadlines will become a problem where the renewal intervals for more than that number of keys overlap.

Another example where schemes for renewing data items face similar problems arises in key-encrypted data storage. In the context of a tape library, for example, a tape drive is generally shared by a number of tapes, which ranges from tens to hundreds, and this number will further increase in the future. According to the current encryption/decryption process, tapes store user data files which are each encrypted with a specific key. The tape drive is a scarce resource, spending most of its cycles on reading or writing encrypted data. When the expiration of any key is approaching, a key-life-cycle management function will identify it and will request the tape drive to first decrypt the associated data file, and then re-encrypt the data with a new (refreshed) key. This process can last quite some time, in the order of hours, depending on the length of the data file in question. Thus, if the number of asynchronous key renewals to be handled by the same tape drive increases sufficiently, the problem of missed deadlines can arise in a manner similar to the key scenario above.

Another data item renewal scenario where this problem will be faced is long-term data storage. If data must be preserved for long periods, the limited lifetime of data on a particular storage medium implies that data files must be periodically renewed by re-storing on the same medium or migration to a new medium. Where a sufficient number of files must be renewed by a read/write drive before their lifetime expires, the problem of missed renewal deadlines will arise as in the previous example.

An article entitled "Single machine scheduling to minimize weighted earliness subject to no tardy jobs," S. Chand and H. Schneeberger, Eur. J. Oper. Res., vol. 34, pp. 221-230, 1988, addresses a "pull" type of production environment where jobs with known processing times and due dates are to be scheduled on a single machine such that they are not tardy and their total earliness is minimized. A job completed earlier than its due time may have to be stored, incurring inventory (holding) costs. In the context of data items such as keys, however, such costs do not arise, the issue being rather one of load on the processor or other renewal mechanism. The problem considered in this reference assumes that there is a given number of jobs to be scheduled and has been shown to be NP-hard. For the dynamic set of data items in the systems described above, solving the static scheduling problem each time a new data item is added to the set would be impractical, if not infeasible, because the problem is very complex (NP-hard) and the number of existing data items is likely to be large. Note that the dynamic programming approach developed in the foregoing reference can cope with at most 15 jobs.

Another approach is considered in the "just-in-time" (JIT) type of manufacturing systems where costs are connected not only with executing jobs too late, but also too early. The optimization problems are associated with goal functions, where there is a penalty for both tardiness and earliness of a job. The total weighted earliness/tardiness problem has been shown to be NP-hard (see "Sequencing with earliness and tardiness penalties: a review", K. R. Baker and G. D. Scudder, Operations Research, vol. 38, 1990, pp. 22-36, 1990). Solving the problem amounts to establishing a sequence of jobs and its starting times. Because of an exponentially growing computation time, exact algorithms can be used only to solve instances where the number of jobs is small. For that reason, approximate algorithms have been proposed based on artificial intelligence methods. The issue of dynamic scheduling of arriving jobs such that the cost due to earliness is minimized has been considered in "Optimal stochastic sequencing with earliness and/or tardiness costs," D. G. Pandelis and D. Teneketzis, in proceedings of the 32nd IEEE Conference on Decision and Control, vol. 4, pp. 3618-3623, December 1993. This is specifically concerned with non-idling scheduling strategies where the machine is not allowed to be idle while jobs wait to be processed. Hence jobs will be served immediately on arrival if the machine is idle. This process is incompatible with the objective of renewing data items as late as possible in the data item management systems addressed herein. Further examples of such known scheduling algorithms are described in: "Single-machine scheduling with early and tardy completion costs," J. S. Davis and J. J. Kanet, Naval Research Logistics, vol. 40, pp. 85-101, 1993; and "Scheduling to minimize maximum earliness and number of tardy jobs where machine idle time is allowed," M. Azizoglu, M. Koksalan, and S. K. Koksalan, Journal of Operational Research Society, vol. 54, no. 6, pp. 661-664, June 2003. Again, however, these references address static systems and are specifically concerned with optimal scheduling for these systems.

SUMMARY OF THE INVENTION

In one aspect, the present invention provides a method for managing renewal of a dynamic set of data items, each having an associated renewal deadline in a data item management system. The method maintains a renewal schedule that allocates to each data item in the set a renewal interval for renewal of the data item by the management system in memory of the data item management system. Upon addition of a new data item to the set, if a potential renewal interval having a duration required for renewal of the new data item by the management system, and having an ending at the renewal deadline for the data new item, does not overlap a time period in the schedule during which the management system is busy, automatically updating the renewal schedule to allocate the potential renewal interval to the new data item. If the potential renewal interval does overlap the time period, the renewal schedule is automatically updated by selecting an earlier renewal interval for at least one data item in the set, and allocating a renewal interval of the required duration to the new data item such that no data item has a renewal interval extending beyond the associated renewal deadline or overlapping the time period. Renewal of each data item is then initiated automatically on commencement of the renewal interval allocated in the schedule to the new data item.

As discussed earlier, in some applications the data items in question can be cryptographic keys. In other applications, the data items in question can be data files, where "file" is used herein in the most general sense and includes any item or collection of data. Additional aspects of the invention, including aspects relating to specific applications, are set forth below.

A second aspect of the invention provides a method of managing a dynamic set of cryptographic keys, each having an associated renewal deadline. The method manages renewal of the set of keys by a method according to the first aspect of the invention. The method further renews each key upon commencement of the renewal interval allocated in the schedule to that key.

A third aspect of the invention provides a computer readable medium containing executable program instructions for managing renewal of a dynamic set of data items, each having an associated renewal deadline, in a data item management system. The executable program instructions include instructions for maintaining in memory of the data item management system a renewal schedule that allocates to each data item in the set a renewal interval for renewal of that data item by the management system. Upon addition of a new data item to the set, if a potential renewal interval having a duration required for renewal of the new data item by the management system and having an ending at the renewal deadline for the new data item does not overlap a time period in the schedule during which the management system is busy, the renewal schedule is automatically updated to allocate the potential renewal interval to the new data item. If the potential renewal interval does overlap the time period, the renewal schedule is automatically updated by selecting an earlier renewal interval for at least one data item in the set and allocating a renewal interval of the required duration to the new data item such that no data item has a renewal interval extending beyond the associated renewal deadline or overlapping the time period. A renewal of each data item is initiated automatically on commencement of the renewal interval allocated in the schedule to the new data item.

It will be understood that the term "computer" is used in the most general sense and includes any device, component or system having a data processing capability for implementing a computer program. Moreover, the executable computer program instructions may constitute an independent program or may be an element of a larger program. The computer readable medium can be supplied, for example, a medium such as a disk or an electronic transmission for loading in a computer. The program instructions can include any expression, in any language, code or notation, of a set of instructions intended to cause a computer to perform the method, either directly or after either or both of (a) conversion to another language, code or notation, and (b) reproduction in a different material form.

A fourth aspect of the invention provides a method of managing a dynamic set of data files in a data storage system, where the data files are encrypted using respective cryptographic keys, each having an associated renewal deadline. Renewal of a stored data file by decrypting the file using the key for that file is performed before the renewal deadline for that key. The method includes managing renewal of the set of data files by the method according to the first aspect of the invention. Additionally, the data file is decrypted using the key for that file upon commencement of the renewal interval allocated in the schedule to a data file.

Preferably, however, the duration of the renewal interval allocated to each data file is sufficient for decrypting the file using the current key, encrypting the data file using a new key, and re-storing the file in the data storage system, whereby all steps are completed before the renewal deadline.

A fifth aspect of the invention provides a method of managing a dynamic set of data files, each having an associated renewal deadline, in a data storage system. Renewal of a stored data file by reading and re-storing of the file is performed before the associated renewal deadline. This method includes managing renewal of the set of data files by the method according to the first aspect of the invention. Additionally, the data file is read and re-stored upon commencement of the renewal interval allocated in the schedule to the data file.

A sixth aspect of the invention provides an apparatus for managing renewal of a dynamic set of data items, each having an associated renewal deadline, in a data item management system. The apparatus includes memory and control logic adapted for maintaining a renewal schedule in the memory of the data management system that allocates, to each data item in the set, a renewal interval for renewal of that data item by the management system. Upon addition of a new data item to the set, if a potential renewal interval having a duration required for renewal of that data item by the management system, and having an ending at the renewal deadline for that item does not overlap a time period in the schedule during which the management system is busy, the renewal schedule is to allocate the potential renewal interval to the new data item. If the potential renewal interval does overlap the time period, the renewal schedule is automatically updated by selecting an earlier renewal interval for at least one data item in the set and a renewal interval of the required duration is allocated to the new data item such that no data item has a renewal interval extending beyond the associated renewal deadline or overlapping the time period. A renewal of each data item by the management system is initiated upon commencement of the renewal interval allocated in the schedule to that data item.

A seventh aspect of the invention provides a cryptographic key management system for managing a dynamic set of cryptographic keys, each having an associated renewal deadline. The includes memory for storing the keys and a renewal controller for renewing keys, and the renewal management apparatus according to the sixth aspect of the invention for managing renewal of the set of keys. The control logic is adapted to initiate renewal of a key by the renewal controller upon commencement of the renewal interval allocated in the schedule to that key.

An eighth aspect of the invention provides a data storage system for storing a dynamic set of data files encrypted using respective cryptographic keys, each having an associated renewal deadline. Renewal of a stored data file is performed by decrypting the file using the key for that file and is performed before the renewal deadline for that key. The system includes data storage for storing the set of encrypted data files, a mechanism adapted to encrypt and decrypt the data files and read and write the encrypted files in the data storage, and the renewal management apparatus according to the sixth aspect of the invention for managing renewal of the set of data files. The control logic is adapted to initiate renewal of a data file by the mechanism by reading and decrypting the data file using the key for that file on commencement of the renewal interval allocated in the schedule to that data file. A ninth aspect of the invention provides a data storage system for storing a dynamic set of data files, each having an associated renewal deadline, such that renewal of a stored data file by reading and re-storing of the file must be performed before the associated renewal deadline. The system includes data storage for storing the set of data files, a mechanism for reading and writing data files in the data storage, and the renewal management apparatus according to the sixth aspect of the invention for managing renewal of the set of data files. The control logic is adapted to initiate reading and rewriting of a data file in the data storage by the mechanism upon commencement of the renewal interval allocated in the schedule to that data file.

BRIEF DESCRIPTION OF THE DRAWINGS

Preferred embodiments of the invention will now be described, by way of example, with reference to the accompanying drawings in which.

DETAILED DESCRIPTION OF THE PREFERRED EMBODIMENTS

In general, where features are described herein with reference to an embodiment of one aspect of the invention, corresponding features may be provided in embodiments of another aspect of the invention as appropriate.

Aspects of the present invention recognize that, in order to avoid missing renewal deadlines for keys and data files in the above systems, the issue of overlapping renewal intervals must be addressed when scheduling renewal of the data items in question.

Scheduling algorithms have been proposed for use in the different context of a production environment. The necessary considerations and objectives for the scheduling process are quite different in this field. For instance, the algorithms are specifically concerned with optimal scheduling, and the problem addressed tends to be a static one in that the number of jobs to be handled is known. In contrast, in the data item management systems discussed above, the set of data items is inherently dynamic, the number of data items change in time as new keys or data files are generated or deleted.

Embodiments of the present invention enable renewal of the data items to be managed in a manner that deals efficiently with a dynamic set, whereby the number of items in the set varies with time, while addressing the problem of overlapping renewal intervals discussed above. A renewal schedule is maintained in system memory and automatically updated when a new data item is added to the set, e.g. when a new key or data file is created in accordance with the particular application in question. The updated schedule for the new set of data items is derived based on the existing schedule for the previous set of data items, resulting in significantly simpler scheduling algorithms than those proposed for the different technology environments discussed above. In addition, the desirability of renewing as late as possible to reduce the renewal processing load is addressed by the schedule update technique.

In particular, when a new data item is added to the set, a potential renewal interval which has the required duration and ends at the renewal deadline for the new item will be allocated to that item if the potential renewal interval does not overlap a time period during which the management system is busy. In this case, therefore, the new data item is allocated the latest possible renewal interval. However, if the potential renewal interval does overlap a busy period, then the automatic update technique effectively involves moving one or more renewal intervals (which can be the potential or previously-allocated renewal intervals) earlier in the schedule to allow allocation of a required interval to the new item before its renewal deadline. Thus, an earlier interval than the potential interval can be selected and allocated for the new data item, or an earlier time can be selected for one or more previously-allocated intervals. This is done in such a way that no interval is moved so as to overlap a busy period. In this way, embodiments of the invention provide a simple and efficient technique allowing all data items in the dynamic set to be renewed as required without missing any deadlines.

Allocated renewal intervals can be defined explicitly or implicitly in the renewal schedule. For example, if the duration of renewal intervals is constant then all renewal intervals can be implicitly defined simply specifying in the schedule a renewal start-time for each data item. If the duration of renewal intervals varies, however, then allocated renewal intervals can be defined, for example, by renewal start- and end-times.

When considering the potential renewal interval for a new data item, the required duration of this interval can be an actual known value for renewal of the data item in question or an estimate thereof, or might be a duration which is deemed to be required such as a worst-case renewal time for the management system in question. As indicated above, the duration of renewal intervals can be constant for all data items or can vary for different data items, depending on the particular application. Examples will be given below.

For the purpose of assessing the potential renewal interval, the management system is deemed busy during any time period in which the system is already fully occupied or has insufficient capacity to handle renewal of the new data item. In some applications, the system may be deemed busy during any allocated renewal interval. In others, the system can be able to handle a predetermined number of renewals concurrently. The system will be deemed busy during any time period being the intersection of that predetermined number of allocated renewal intervals.

In an embodiment of a schedule update technique of the invention, when a new data item is added to the set, the schedule determines whether the potential renewal interval overlaps a busy time period. If the interval overlaps, the schedule is automatically updated by selecting and allocating to the new data item the latest earlier interval of the required duration which does not overlap a busy period. This technique always allocates to a new data item the optimum (latest possible) renewal interval where this is available, and otherwise allocates the latest available interval before the renewal deadline.

In another embodiment of a schedule update technique of the invention, when a new data item is added to the set the schedule update technique allocates the potential renewal interval to the new data item, and determines from the schedule whether the interval overlaps a busy period. If the interval overlaps, the update process moves one or more previously-allocated renewal intervals to an earlier time, as necessary, to ensure that no renewal interval overlaps a busy period. The details of this process will be described below. Additionally, other aspects of the invention adaptively switch between the two update techniques just described to increase overall efficiency.

Figure 2:
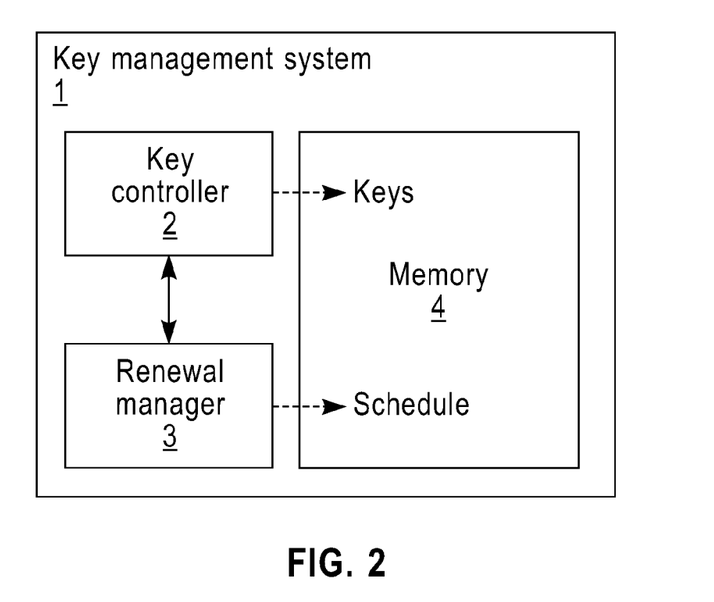
FIG. 2 is a schematic representation of a key management system according to an aspect of the present invention.

FIG. 2 is a simplified schematic of a key life-cycle management system 1 indicating the main elements involved in operation of the system. System 1 includes a key controller 2, a key renewal manager 3 and memory 4. Key controller 2 and renewal manager 3 are each implemented by control logic which performs the various key management functions detailed below. In general, this control logic could be implemented in hardware, software or a combination thereof. In this example, system 1 is implemented by a general purpose computer, with the key controller 2 and renewal manager 3 implemented by respective software modules running on the computer system. Suitable software will be apparent to those skilled in the art from the description of operation herein. System memory 4 stores various data required for operation of the system 1. This includes the set of keys to be managed and a renewal schedule for these keys as indicated in the figure.

In operation, key controller 2 maintains the set of keys $S_N=\{k_1, k_2, \ldots, k_i, \ldots, k_N\}$ in memory 4 together with associated information for each key such as details of the application, user, etc. for the key. The keys in the key-set change constantly with time as new keys are generated and existing keys are deleted under control of key controller 2. Each key $k_i$ generated at a time $g_i$ has an associated renewal deadline $e_i$ determined by the lifetime $U_i$ of the key. For simplicity, it is assumed that the lifetime for all keys is a constant U, although the renewal processes can also operate equally well where the key lifetime is variable. Renewal of keys is performed by key controller 2 at timings controlled by renewal manager 3. In particular, renewal manager 3 maintains a renewal schedule in memory 4 which indicates a renewal time $r_i$ for each key $k_i$. The renewal time $r_i$ marks the start of a renewal interval which has been allocated by renewal manager 3 to the key. This renewal interval has a duration $\Delta$ which corresponds to the time required for the key renewal process performed by key controller 2. Initially, the key controller may perform the renewal process for only one key at a time, the duration $\Delta$ of this renewal process being constant for all keys. Thus, for key $k_i$ to be renewed before its renewal deadline $e_i$, the renewal process should be initiated at $r_i \leq \tau_i$ where $\tau_i = e_i - \Delta$. This is ensured by renewal manager 3 which allocates renewal intervals as keys are added to the key-set in accordance with a schedule update process described below.

Figure 3:
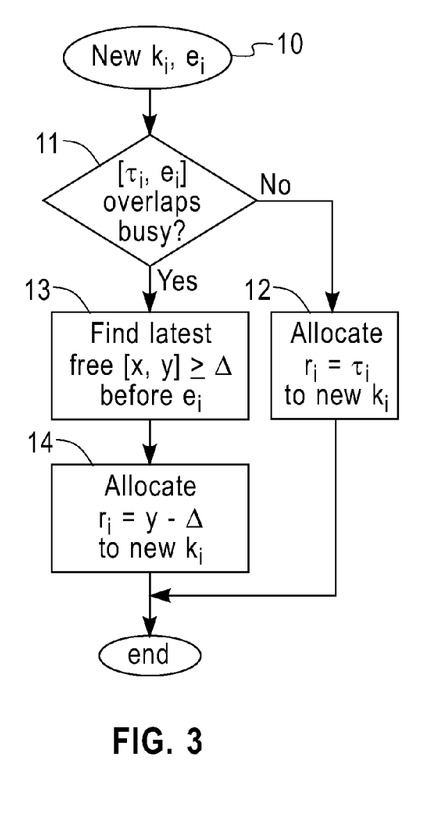
FIG. 3 indicates steps of a first schedule update technique in the FIG. 2 system.

In an embodiment of the invention, a schedule update process performed by renewal manager 3 is illustrated in FIG. 3. The process begins at step 10 on receipt from the key controller of information identifying the new key $k_i$ and its renewal deadline $e_i$. The renewal manager first assesses the latest possible renewal interval as a potential renewal interval for the new key. This potential interval is denoted by $[\tau_i, e_i]$ indicating that the interval starts at $\tau_i$ and ends at the renewal deadline $e_i$. In decision step 11, renewal manager 3 accesses the schedule in memory 4 to determine if the potential interval $[\tau_i, e_i]$ overlaps a time period in which the key controller is already busy. In this example, key controller 2 can only handle one renewal process at a time and is thus deemed busy during any previously allocated renewal interval. If $[\tau_i, e_i]$ does not overlap a busy period, operation proceeds to step 12 wherein renewal manager 3 updates the renewal schedule to allocate $[\tau_i, e_i]$ as the renewal interval for the new key by setting the renewal time for the key as $r_i = \tau_i$. The update process is then complete. If, however, decision step 11 reveals that the potential interval $[\tau_i, e_i]$ overlaps a busy period, the operation proceeds to step 13. The renewal manager 3 analyzes the renewal schedule to identify the latest "free" interval $[x,y]$, earlier than $[\tau_i, e_i]$, which has a duration of at least the required duration $\Delta$, where "free" means not overlapping a busy period, i.e. a previously allocated renewal interval. In step 14 the schedule is updated to allocate the interval $[y-\Delta, y]$ as the renewal interval for the new key by setting the renewal time for the key as $r_i = y-\Delta$. The update process is then complete.

Figure 5A:
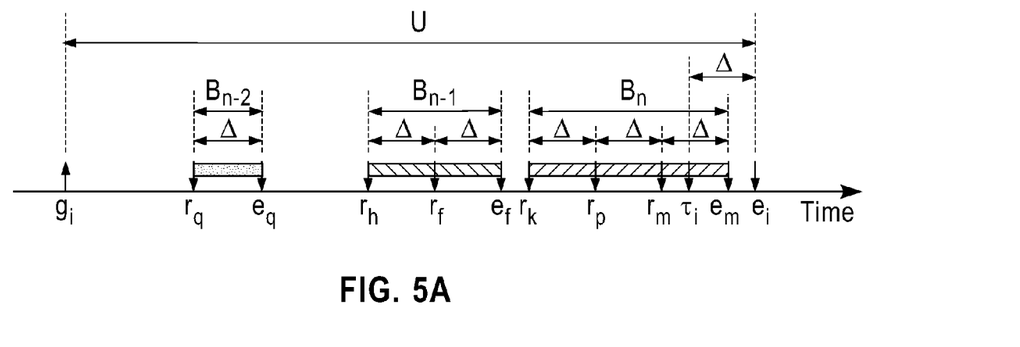
FIGS. 5a, 5b and 5c illustrate busy periods in a renewal schedule before and after application of the first and second update techniques.
Figure 5B:
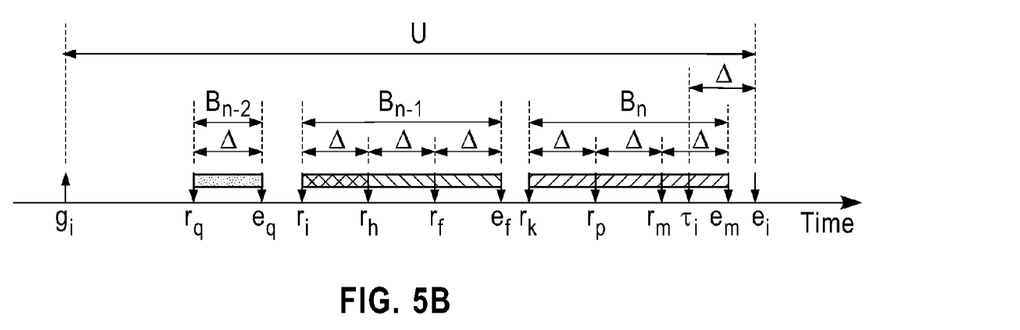

The effect of steps 13 and 14 in the above process is clearly illustrated by the simple example of FIGS. 5a and 5b. FIG. 5a represents the state of the renewal schedule, with previously allocated renewal intervals for a number of existing keys, when the new key $k_i$ is added to the set. There are n busy periods of which the last three are illustrated, i.e. periods $B_{n-2}$, $B_{n-1}$, and $B_n$. The potential renewal interval $[\tau_i, e_i]$ for $k_i$ overlaps $B_n$ as shown. The updated schedule after steps 13 and 14 of FIG. 3 is represented in FIG. 5b. This shows that the latest free interval of length $\Delta$, $[r_i, r_h]$, has been allocated to $k_i$.

The above update process is neatly expressed in the following algorithm:

Busy={ };

For each generated key $k_i$, its renewal time is set as follows
If $[\tau_i,]$ does not overlap with Busy, set $r_i=\tau_i$, and Busy=Busy∪$[r_i, e_i]$
otherwise find the latest free area [x,y], with $y<e_i$, of length which is at least $\Delta$ and set
$r_i=y-\Delta$ and Busy=Busy∪$[r_i, y]$ Renewal manager 3 monitors the current time and notifies key controller 2 when the renewal time $r_i$ of a key $k_i$ is reached. The key controller then performs the renewal process for this key. The resulting new key is stored in memory 4 and constitutes a new key added to the key-set. Key controller 2 thus prompts renewal manager 3 to update the schedule to accommodate the new key, and the cycle is complete. (Note that a "new" key could in fact be identical to the old key, e.g. where some periodic refresh process must be performed for a key to remain valid). The result of this process ensures that all keys are renewed before expiry, that the optimum renewal interval is allocated to each new key where this is available, and where it is not available the latest possible preceding interval is allocated. Note that the update process can also be applied where the key controller can renew a given number, say X, keys at the same time. In this case, a busy period is simply defined as the intersection of X allocated renewal intervals.

Figure 4:
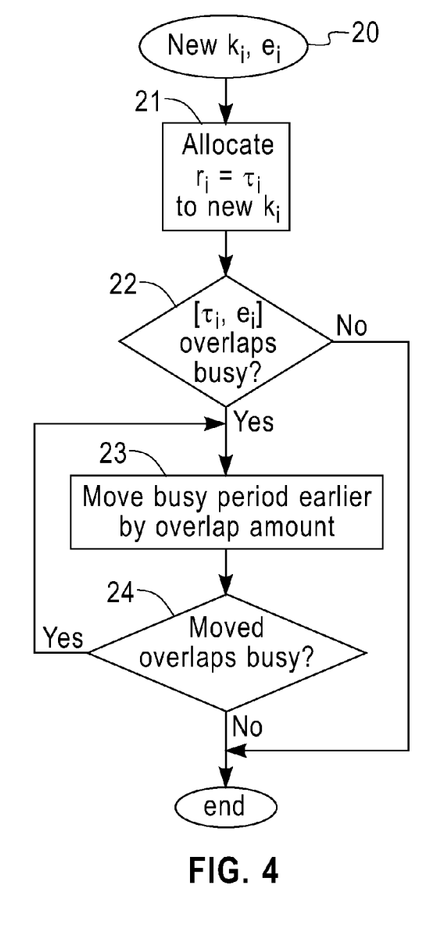
FIG. 4 indicates steps of a second schedule update technique in the FIG. 2 system.

In another embodiment of the invention, a schedule update process performed by renewal manager 3 is illustrated in FIG. 4. The process begins at step 20 on receipt from the key controller of information identifying the new key $k_i$ and its renewal deadline $e_i$ as before. However, renewal manager 3 simply allocates the potential renewal interval $[\tau_i, e_i]$ defined above as the renewal interval for the new key by setting the renewal time in the schedule as $r_i=\tau_i$ in step 21. Next, in decision step 22 the renewal manager determines from the schedule whether the interval $[\tau_i, e_i]$ overlaps a busy period, i.e. a previously allocated renewal interval. If not, no action is required and the process terminates. If so, however, in step 23 the renewal manager updates the schedule by moving the busy period overlapped by $[\tau_i, e_i]$ earlier by the amount of the overlap. In step 24 the renewal manager then determines whether the period just moved then overlaps another busy period. If not the process terminates, but if so, step 23 is repeated for the newly overlapped period. The steps of moving overlapped periods earlier continues until no renewal interval overlaps a busy period, whereupon the update process is complete.

The above update process is expressed in the following algorithm:

Busy={ };

For each generated key $k_i$, its renewal time is set as follows $r_i=\tau_i$.
If $[\tau_i, e_i]$ does not overlap with Busy, set Busy=Busy∪$[\tau_i, e_i]$
otherwise shift Busy period(s) earlier, adjusting all renewal times
$r_j$ for the shifted period. Then set Busy=Busy∪$[\tau_i, e_i]$.

Figure 5C:
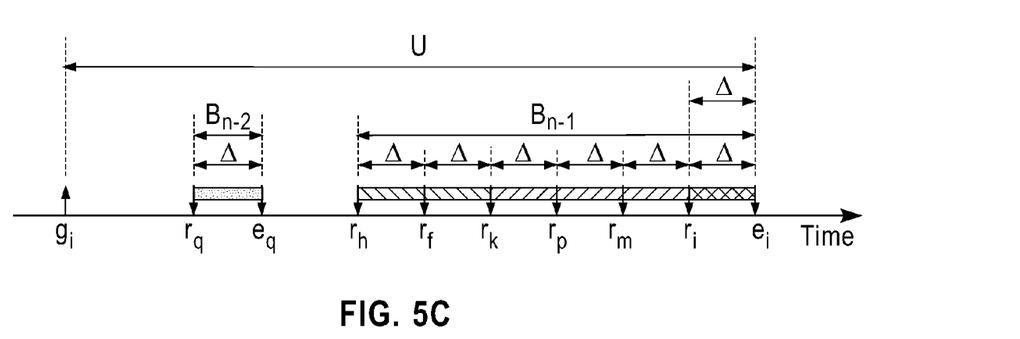

FIG. 5c shows the state of the renewal schedule following operation of this second update process for the initial situation shown in FIG. 5a. According to the second algorithm, $r_i$ is set to $e_i-\Delta$ and busy period $B_n$ is shifted earlier by $e_m-\tau_i$. This also causes period $B_{n-1}$ to be appropriately shifted to the left. Thus, renewal times $r_h$, $r_f$, $r_k$, $r_p$, and $r_m$, are adjusted accordingly. Note that these shifts create a longer busy period, denoted by $B_{n-1}$, which includes these renewal times together with $r_i$. Thus, the number of busy periods is reduced by one. In general, the number of busy periods is reduced by the number of periods shifted minus one. Note also that, while a succession of contiguous renewal intervals forming a busy period is described and moved as one entity in steps 23 and 24 above, the overall effect of these steps in terms of individual renewal intervals is effectively as follows.

Where the potential renewal interval $[\tau_i, e_i]$ overlaps a busy period: (a) move the overlapped renewal interval earlier by the overlap amount with the potential renewal interval; (b) if the interval moved then overlaps another busy period, repeat step (a) for the renewal interval overlapped by the moved interval; and (c) repeat step (b) until no renewal interval overlaps a busy period. Moreover, if the key controller can handle renewal of X keys concurrently, so that a busy period is the intersection of X previously-allocated renewal intervals, it will be necessary to move only one of these previously-allocated intervals earlier in the event of an overlap. In this case the steps are as follows. Where the potential renewal interval $[\tau_i, e_i]$ overlaps a busy period: (a) move earlier by the overlap amount another allocated renewal interval which intersects $[\tau_i, e_i]$ by that overlap amount; (b) if the interval moved then overlaps a busy period, repeat step (a) for another allocated renewal interval which intersects the moved interval; and (c) repeat step (b) until no renewal interval overlaps a busy period.

The second update technique always allocates the optimum renewal interval initially to a new key, while shifting pre-existing renewal intervals earlier as required. As with the first technique, all keys will be renewed before their deadlines. However, by allowing previously-allocated intervals to be adjusted as described, this update technique enables more efficient use to be made of available schedule time. Either update technique can be employed in key management system 1 as deemed appropriate for the system in question. However, in particularly preferred embodiments, renewal manager 3 can adaptively switch between the two update techniques in dependence on the number of keys to be managed. When the number of keys in the key-set is low, the first update process is employed. However, if the number of keys exceeds a threshold value, the renewal manager automatically switches to application of the second, more efficient update process. The threshold can be set as deemed appropriate for the parameters of a given system.

It will be apparent that the above techniques can also be applied in the case where the key lifetime U is not constant but key-dependent. Furthermore, they can also be applied in the case where the duration of the process for renewing keys is not fixed but variable. For example, where the key controller can handle renewal of multiple keys concurrently, the true time required for a given key renewal process can vary, taking longer the more renewals are handled at the same time. In this case, a constant renewal time $\Delta$ could simply be set as a tight upper bound of the variable duration, i.e. as a "worst-case" duration. In general however, the duration $\Delta$ of renewal intervals may not be constant for all keys, and in this case the duration of each interval will be indicated in the schedule, e.g.

by explicitly storing renewal start- and stop-times, or by storing the start time and the value of Δ for each key.

Figure 6:
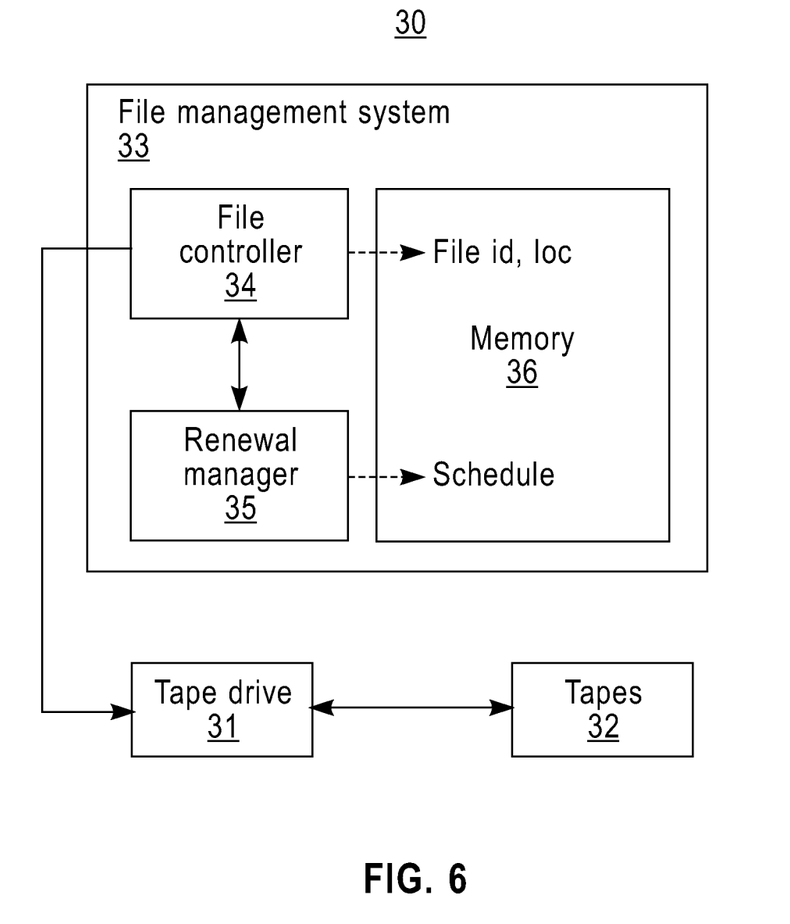
FIG. 6 is a schematic representation of a data storage system according to the present invention.

Additional aspects of the renewal management processes embodying the invention are described with reference to FIG. 6. In this example, the data items to be renewed are data files and the management system is a data storage system, such as a tape-library 30. As indicated schematically in FIG. 6, tape library 30 includes a tape drive 31 for reading and writing of data files on magnetic tapes 32. Operation of drive 31 is controlled by a file management system indicated generally at 33. The file management system includes a file controller 34, a renewal manager 35 and memory 36. The function and operation of components 34, 35 and 36 of file management system 33 are broadly similar to those of components 2, 3 and 4 of the key management system 1 described above, and only the application-specific differences will be detailed in the following. Thus, file controller 34 controls renewal of a dynamic set of data items as described below, though in this case the main data items to be renewed are files stored on tapes 32 rather than keys stored in system memory. For each file in the system, file controller 34 maintains a record of that file in system memory 36, e.g. a file id and its location, as indicated in the figure, together with any associated file information. A renewal deadline is associated with each data file as discussed further below. Renewal manager 35 maintains a renewal schedule in memory 36, the schedule allocating a renewal interval for renewal of each data file by file controller 34 such that all files will be renewed before their associated deadline. On commencement of an allocated renewal interval in the schedule, the renewal manager 35 notifies file controller 34 which then effects renewal of the file as described below.

An application of this aspect addresses the scenario where key-encrypted data files are stored in tape library 30. In this case, files written to tapes 32 are encrypted by drive 31 prior to recording. The keys used for encrypting respective data files are maintained by file controller 34 and stored in system memory 36. Each key has a specified lifetime and must be renewed before its lifetime expires. The process of renewing keys inherently involves renewing of data files. To renew a key, the associated data file must be read from storage, decrypted using the current key, encrypted using the new (refreshed) key, and written again to tape. It should be noted that "key" as used here can include an asymmetric key pair where different keys are required for encryption and decryption. Thus, in the renewal schedule managed by renewal manager 35, the renewal deadlines for data files are the associated key renewal deadlines. When a new file is encrypted and stored in the library, the file controller 34 stores the key for the file in memory 36. File controller then notifies renewal manager 35 of the renewal deadline $e_i$ for the new file together with the required duration Δ of the renewal interval to be allocated to that file. This duration Δ is calculated by file controller 34 according to the size of the data file in question, since clearly larger files will take longer to decrypt and re-encrypt in the renewal process. The renewal manager then updates the renewal schedule to allocate a renewal interval to the new file using an update process as described above for key management system 1. The renewal start- and end-times are recorded in the schedule to accommodate the variable interval duration Δ. On commencement of that renewal interval, renewal manager 35 notifies file controller 34 which performs the key renewal and controls drive 31 to perform renewal of the data file in question. The renewed file is treated as a new file added to the system, whereby renewal manager 35 is instructed to update the schedule accordingly. The cycle is then complete.

A further application of this aspect addresses the scenario where tape library 30 is used for long-term storage of data files. Due to the limited lifetime of data on tape, stored files must be periodically renewed by reading and re-writing, preferably to a new tape 32. In this scenario, file controller 34 will notify renewal manager 35 of the renewal deadline $e_i$ and required duration Δ for each newly-stored file, and renewal manager 35 will update the renewal schedule to allocate a renewal interval to this file as above. On commencement of the renewal interval, renewal manager 35 will notify the file controller 34. File controller 34 then controls the drive 31 to renew the file by reading and re-writing to tape, and the cycle recommences for the newly-stored file.

It will be appreciated that various changes and modifications can be made to the specific embodiments described above. For example, while the management system 1, 33 is described as implemented by a single computer in the above examples, in general the functionality of the various components could be implemented for example, in a distributed system and memory 4, 36 could be implemented for example, by different storage components. As another example, in the key-encrypted storage application, additional aspects of the invention might be envisaged where only the read-back and decryption of a data file must be completed before the decryption key expires, with encryption/re-writing with new key being handled separately, e.g. by fitting in free schedule time. Preferably, however, all steps required to re-store a file encrypted with the new key are accommodated as above. Many other changes and modifications can be made to the exemplary embodiments described without departing from the scope of the invention.

We claim:

1. A method of managing renewal of a dynamic set of data items in a data item management system, each data item having an associated renewal deadline, the method comprising:

maintaining in memory of the data item management system a renewal schedule allocating to each data item in the set a renewal interval for renewal of the data item by the management system;

on addition of a new data item to the set, wherein the potential latest possible renewal interval overlaps a time period in the renewal schedule during which the data item management system is busy, applying one of first and second update techniques, and adaptively switching between the first and second update techniques in dependence on a number of data items in the set as the number of data items in the set varies dynamically in time, such that the second update technique is applied when the number exceeds a predetermined threshold; and initiating renewal of each data item automatically on commencement of the renewal interval allocated in the renewal schedule to the new data item;

wherein said set of data items is dynamic in that a number of data items in said set of data items varies dynamically in time.

2. The method according to claim 1 further comprising:

on addition of the new data item to the set, applying an update technique comprising determining from the renewal schedule whether the potential latest possible renewal interval overlaps the time period; and if the potential latest possible renewal interval overlaps the time period, automatically updating the renewal schedule by selecting the latest earlier interval of the a duration required for renewal which does not overlap the time period and allocating that interval as the renewal interval for the new data item.

3. The method according to claim 1 further comprising:
on addition of the new data item to the set, applying an update technique comprising automatically updating the renewal schedule by allocating the potential latest possible renewal interval to the new data item, and determining from the renewal schedule whether the potential latest possible renewal interval overlaps the time period, and if the potential latest possible renewal interval overlaps the time period:
(a) moving earlier by the overlap amount another allocated renewal interval which intersects the potential latest possible renewal interval by that overlap amount;
(b) if the interval moved overlaps the time period, repeating step (a) for another allocated renewal interval which intersects the moved interval; and
(c) repeating step (b) until no renewal interval overlaps the time period.

4. The method according to claim 1 wherein the first update technique comprises automatically updating the renewal schedule by selecting a latest earlier interval of a duration required for renewal which does not overlap the time period and allocating that interval as the renewal interval for the new data item;
and wherein the second update technique comprises automatically updating the renewal schedule by allocating the potential latest possible renewal interval to the new data item, and determining from the renewal schedule whether the potential latest possible renewal interval overlaps the time period, and
(a) moving earlier by the overlap amount another allocated renewal interval which intersects the potential latest possible renewal interval by that overlap amount,
(b) if the interval moved overlaps the time period, repeating step (a) for another allocated renewal interval which intersects the moved interval, and
(c) repeating step (b) until no renewal interval overlaps the time period.

5. The method according to claim 1 wherein the management system is busy during an allocated renewal interval.

6. A method according to claim 1 wherein the management system is busy during any time period that is the intersection of a predetermined plurality of allocated renewal intervals.

7. An article of manufacture comprising a computer program product, said computer program product in turn comprising a tangible computer readable storage medium storing in a non-transitory manner executable program instructions which when executed, implement the steps of a method according to claim 1.

8. A method of managing a dynamic set of cryptographic keys, each having an associated renewal deadline, the method comprising:
managing renewal of the set of keys by the method according to claim 1; and
renewing each key on commencement of the renewal interval allocated in the renewal schedule to that key.

9. The method as claimed in claim 8 wherein the a duration of renewal intervals is a predetermined constant.

10. A method of managing a dynamic set of data files in a data storage system wherein data files are encrypted using respective cryptographic keys, each having an associated renewal deadline such that renewal of a stored data file by decrypting the file using the key for that file is performed before the renewal deadline for that key, the method comprising:
managing renewal of the set of data files by the method according to claim 1; and
decrypting the data file using the key for that file on commencement of the renewal interval allocated in the renewal schedule to the data file.

11. The method according to claim 10 further comprising:
on commencement of the renewal interval allocated in the renewal schedule to the data file, renewing the data file by decrypting the data file using the key for that file, encrypting the data file using a new key for that file and re-storing the file in the data storage system, wherein a duration of the renewal interval allocated to each data file is sufficient for renewing of that data file.

12. The method according to claim 10 wherein a duration of the renewal interval allocated to each data file is dependent on the size of that data file.

13. A method of managing a dynamic set of data files, each having an associated renewal deadline, in a data storage system wherein renewal of a stored data file by reading and re-storing of the file is performed before the associated renewal deadline, the method comprising:
managing renewal of the set of data files by the method according to claim 1; and
reading and re-storing the data file in the data storage system on commencement of the renewal interval allocated in the renewal schedule to the data file.

14. A method according to claim 13 wherein a duration of the renewal interval allocated to each data file is dependent on the size of that data file.

15. An apparatus for managing renewal of a dynamic set of data items in a data item management system, each data item having an associated renewal deadline, the apparatus comprising memory and control logic adapted for:
maintaining in the memory a renewal schedule allocating to each data item in the set a renewal interval for renewal of the data item by the management system;
on addition of a new data item to the set,
wherein the potential latest possible renewal interval overlaps a time period in the renewal schedule during which the data item management system is busy, applying one of first and second update techniques, and adaptively switching between the first and second update techniques in dependence on the number of data items in the set as said number of data items in said set varies dynamically in time, such that the second update technique is applied when the number exceeds a predetermined threshold; and
initiating renewal of each data item by the management system on commencement of the renewal interval allocated in the renewal schedule to that data item;
wherein:
said set of data items is dynamic in that a number of data items in said set of data items varies dynamically in time; and
said control logic comprises at least one of:
specialized logic circuitry; and
a general purpose hardware processor having access to a tangible computer readable storage medium storing in a non-transitory manner executable program instructions which when executed on said general purpose hardware processor implement said control logic.

16. The apparatus according to claim 15 wherein the control logic is adapted for applying, on addition of a new data item to the set, an update technique comprising determining from the renewal schedule whether the potential latest possible renewal interval overlaps the time period and, if the potential latest possible renewal interval overlaps the time period, automatically updating the renewal schedule by selecting the latest earlier renewal interval of a duration required for renewal which does not overlap the time period and allocating that interval as the renewal interval for the new data item.

17. The apparatus according to claim 15 wherein the control logic is adapted for applying on addition of a new data item to the set, an update technique comprising automatically updating the renewal schedule by allocating the potential latest possible renewal interval to the new data item, and determining from the renewal schedule whether the potential latest possible renewal interval overlaps the time period, and if the potential latest possible renewal interval overlaps the time period:
(a) moving earlier by the overlap amount another allocated renewal interval which intersects the potential latest possible renewal interval by that overlap amount;
(b) if the interval moved overlaps the time period, repeating step (a) for another allocated renewal interval which intersects the moved interval; and
(c) repeating step (b) until no renewal interval overlaps the time period.

18. The apparatus according to claim 15 wherein:
the first update technique comprising automatically updating the renewal schedule by selecting a latest earlier interval of a duration required for renewal which does not overlap the time period, and allocating that interval as the renewal interval for the new data item; and
the second update technique comprising automatically updating the renewal schedule by allocating the potential latest possible renewal interval to the new data item, determining from the renewal schedule whether the potential latest possible renewal interval overlaps the time period, and
(a) moving earlier by the overlap amount another allocated renewal interval which intersects the potential latest possible renewal interval by that overlap amount,
(b) if the interval moved overlaps the time period, repeating step (a) for another allocated renewal interval which intersects the moved interval, and
(c) repeating step (b) until no renewal interval overlaps the time period.

19. The apparatus according to claim 15 wherein the control logic is adapted such that the management system is busy during an allocated renewal interval.

20. The apparatus according to claim 15 wherein the control logic is adapted such that the management system is busy during any time period that is the intersection of a predetermined plurality of allocated renewal intervals.

21. A cryptographic key management system for managing a dynamic set of cryptographic keys, each having an associated renewal deadline, the system comprising:
memory for storing the keys;
a key controller for renewing keys; and
the renewal management apparatus according to claim 15 for managing renewal of the set of keys, the control logic being adapted to initiate renewal of a key by the key controller on commencement of the renewal interval allocated in the renewal schedule to that key.

22. The system according to claim 21 wherein a duration of renewal intervals is a predetermined constant.

23. A data storage system for storing a dynamic set of data files encrypted using respective cryptographic keys, each having an associated renewal deadline such that renewal of a stored data file by decrypting the file using the key for that file is performed before the renewal deadline for that key, the system comprising:
data storage for storing the set of encrypted data files;
a mechanism adapted for encryption and decryption of data files and reading and writing of encrypted files in the data storage; and
the renewal management apparatus according to claim 15 for managing renewal of the set of data files, the control logic being adapted to initiate renewal of a data file by the mechanism by reading and decryption of the data file using the key for that file on commencement of the renewal interval allocated in the renewal schedule to that data file.

24. The system according to claim 23 adapted such that on commencement of the renewal interval allocated in the renewal schedule to a data file, the renewal of the file by the mechanism comprises reading and decryption of the data file using the key for that file, encryption of the data file using a new key for that file and writing of the encrypted file in the data storage, wherein a duration of the renewal interval allocated to each data file is sufficient for the renewal of that data file.

25. The system according to claim 23 wherein the control logic is adapted such that a duration of the renewal interval allocated to each data file is dependent on the size of that data file.

26. A tape library comprising the system according to claim 23 wherein the data storage comprises a plurality of magnetic tapes.

27. A data storage system for storing a dynamic set of data files, each having an associated renewal deadline, such that renewal of a stored data file by reading and re-storing of the file must be performed before the associated renewal deadline, the system comprising:
data storage for storing the set of data files;
a mechanism for reading and writing of data files in the data storage; and
the renewal management apparatus according to claim 15 for managing renewal of the set of data files, the control logic being adapted to initiate reading and rewriting of a data file in the data storage by the mechanism on commencement of the renewal interval allocated in the renewal schedule to that data file.

28. The system according to claim 27 wherein the control logic is adapted such that a duration of the renewal interval allocated to each data file is dependent on the size of that data file.

29. A tape library comprising the system according to claim 27 wherein the data storage comprises a plurality of magnetic tapes.

* * * * *